UNITED STATES PATENT OFFICE.

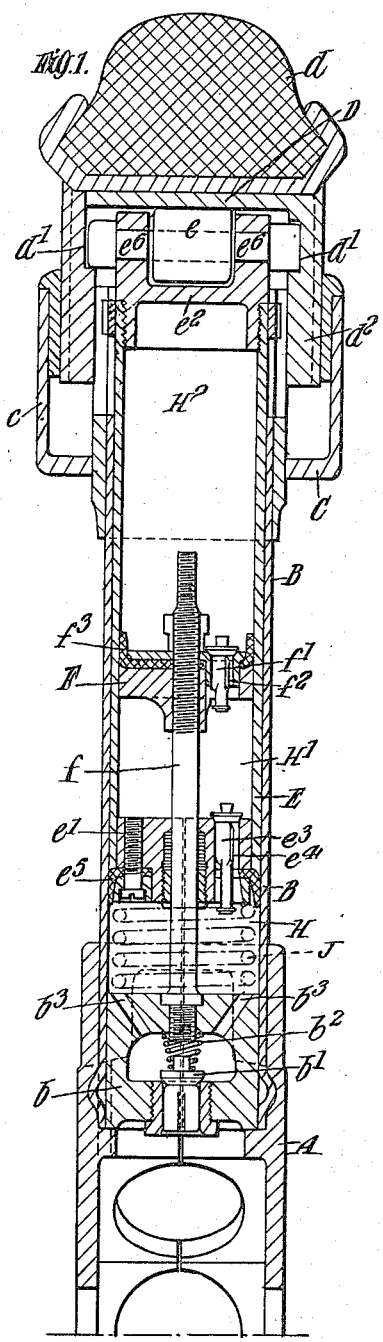

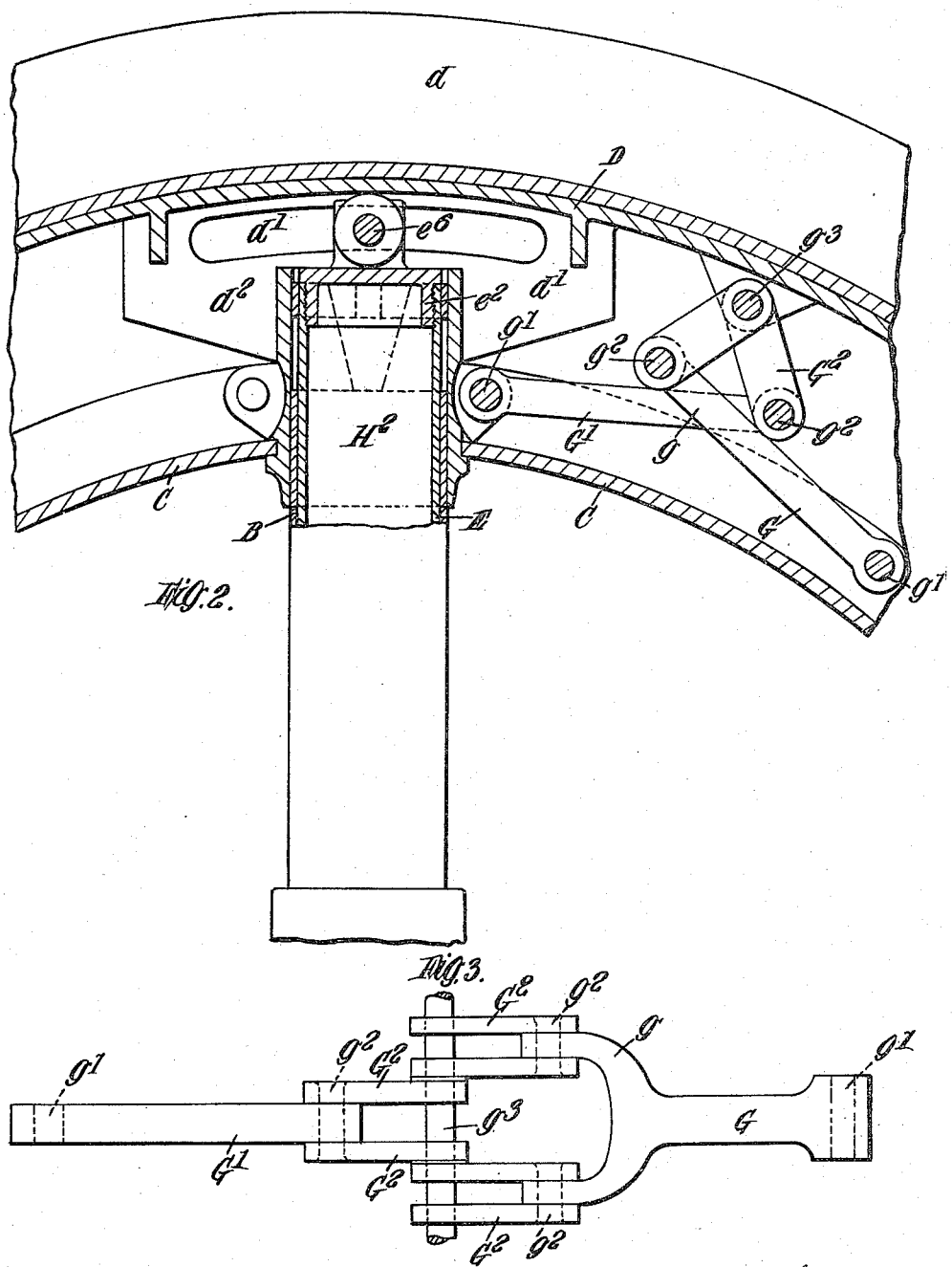

ALFRED SPEIGHT, OF WIMBLEDON PARK, ENGLAND, ASSIGNOR OF ONE-HALF TO EDWARD WILLIAM MEREDITH, OF LONDON, ENGLAND.

CONSTRUCTION OF RESILIENT WHEELS.

1,160,336.  Specification of Letters Patent.  Patented Nov. 16, 1915.

Application filed November 11, 1914. Serial No. 871,475.

*To all whom it may concern:*

Be it known that I, ALFRED SPEIGHT, a subject of the King of Great Britain, residing at 61 Arthur road, Wimbledon Park, in the county of Surrey, England, have invented certain new and useful Improvements in the Construction of Resilient Wheels, of which the following is a specification.

This invention relates to resilient wheels of the type wherein a displaceable wheel rim is mounted upon pneumatic piston and cylinder mechanism in which the necessary pneumatic pressure is produced automatically during the running of the vehicle by a pumping action.

According to our invention a displaceable outer rim is driven from a fixed felly carried by tubular spokes or cylinders mounted on the wheel hub and receiving sliding pump pistons radially supporting the outer rim by means of the air pressure produced in the cylinders. The compression stroke of the pump occurs, as in the known constructions of pneumatic spoke type, during the travel of the cylinder from top to bottom of the wheel while the suction stroke, drawing in air through a suitable non-return valve, occurs during the upward movement of the cylinder as the wheel runs over the ground.

In the construction of wheel we prefer to employ, the spokes are constituted of strong cylinders fixed to a suitable hub and mounted at their outer ends in a fixed felly. Within each cylinder slides a hollow cylindrical piston of considerable length, closed at both ends. Through the inner end of the hollow piston extends a fixed piston rod mounted on the hub or inner end of the fixed cylinder and carrying an inner piston. Three air chambers are formed in this manner, an inner one between the inner end of the hollow piston and the end of the cylinder and two within the hollow piston itself, on either side of the fixed piston. Three non-return valves are arranged to open in the same direction and the air in either the inner chamber or the chamber at the outer side of the fixed piston will on compression be driven into the second chamber which, since it is formed between the inner end of the hollow piston and the fixed piston, expands in volume as the first chamber is reduced. The air in the third chamber (either the outer or the inner according to the arrangement of valves) is compressed and exerts an outward pressure on the piston and therefore on the wheel rim. The valves of the fixed piston and inner end of the hollow piston are arranged to have only a small opening so that air passes through comparatively slowly. The pressure in the first chamber may therefore rise considerably above that of the middle chamber during the brief period of compression due to the ordinary running of the vehicle, the pressure in both the inner and the outer chambers thus assisting in the support of the vehicle when the piston is under compression at the lower side of the wheel. The wheel rim is driven from the fixed felly through crossing links arranged in pairs so that radial freedom is permitted to the rim while it is prevented from turning relatively to the felly. There is no driving connection between the rim and the pistons.

In order that the said invention may be clearly understood and readily carried into effect, we will now proceed to describe the same more fully with reference to the accompanying drawings, in which:—

Figure 1 is a vertical section through one of the wheel spokes and the rim, showing the pump mechanism. Fig. 2 is a side elevation partly in section, showing the link arrangement connecting the rim to the felly; and Fig. 3 is a plan of the links in extended position.

A is the wheel hub carrying tubular spokes or cylinders B connecting the hub to the fixed flanged felly C.

D is the rim fitted with tire $d$ of any suitable kind, an ordinary solid rubber tire being shown.

E is one of the hollow pistons supporting the rim D through a roller $e$.

F is a fixed piston mounted on the rod $f$ carried by the inner end $b$ of the cylinder B.

G, G' and $G^2$ are the links connecting the rim and felly together for driving purposes.

As will be seen in Fig. 1 three successive air chambers H, H' and $H^2$ are provided between, respectively, the cylinder end $b$ and piston head $e'$, the head $e'$ and fixed piston F, and the piston F and outer end or cap $e^2$ of the hollow piston E. The inlet valve $b'$ for the air is shown in the cylinder end $b$ and opens outwardly from the wheel axis against the pressure of a spring $b^2$, the air passing freely into the first chamber H through passages $b^3$. A smaller valve $e^3$ is provided in the piston head $e'$ and allows of the passage of air from the chamber H to the middle chamber H' through a restricted passage $e^4$, so that the flow of air is slow and the pressure in the chamber H may rise considerably above that in the middle chamber H' when the piston head $e'$ moves inwardly toward the end of the cylinder. The valve $e^3$ may be closed only by the pressure of air in the chamber H'.

The fixed piston F also carries a small non-return valve $f'$ opening outwardly and permitting air to escape through a restricted passage $f^2$ from the middle chamber H' into the third chamber $H^2$, which is contained in the outer part of the hollow piston E so that the air within this chamber exercises outward pressure against the end of the piston E.

Cup leathers $e^5$ and $f^3$ on the pistons E and F make the pistons airtight in the cylinders, the cup leathers being secured in place in any convenient manner. The fixed piston F may be adjustable on its rod $f$ by a screw and lock nut device as shown, so that the relative lengths of the chambers H' and $H^2$ may be regulated.

The general operation of the pump mechanism is as follows:—At the upper side of the wheel the rim D, which is rigid, is of course at a greater distance from the felly C than at the bottom where the wheel meets the road, and the outer or suction stroke of the piston E occurs as it travels from bottom to top of the wheel, the rim actuating the piston through the ends of the roller pin $e^6$, which are confined in grooves $d'$ in the walls of the rim flanges $d^2$. During this stroke the inner and outer chambers H and $H^2$ expand and the middle one H' contracts. When the pressure in the inner chamber H falls below that of the atmosphere a further charge of air is drawn in. The pressure in the middle chamber assists in the support of the vehicle, transmitting downward pressure to the upper side of the rim through the piston E so that the piston device is effective both above and below the center of the wheel. When the pressure of air in the middle chamber H' exceeds that in the outer chamber $H^2$ some of the compressed air escapes into the latter and maintains its pressure at the desired point. To prevent an accumulation of pressure in this outer chamber small vents may be provided, uncovered at the extreme end of the outer piston stroke to allow of sufficient leakage of air to keep down the internal pressure to the desired level, but these vents are not shown as they do not appear to be necessary in all cases. It will be seen that each piston device during the in and out stroke given at each turn of the wheel draws in air at one end, compresses it and drives it toward the other end. The constant supply of air under pressure produced by the ordinary running of the vehicle avoids the necessity of using external pumping means, as even on starting without internal pressure the pressure is almost immediately raised to the required amount. Springs may however be placed in the air chambers to give additional support to the rim when the wheel is partly or wholly deflated, as indicated in chain lines at J, Fig. 1. Vibrations due to irregularities of the road also assist in the pumping action, by which action road shocks are absorbed. The action of the apparatus will be substantially the same whether the air is drawn into the inner chamber and escapes from the outer chamber, or vice versa, according to the direction in which the valves are arranged to open.

Since the connection between the rim D and piston E is a sliding one through the grooves $d'$ and roller pin $e^6$, the special driving connection is required between the rim and the felly, which must be so arranged that a limited freedom of the rim is provided for both radially and circumferentially, to allow of the compression of the wheel at the ground and of the necessary pump action. For driving purposes we arrange between the wheel spokes or pistons a system of links, each system comprising a pair of long crossing links G, G', one of which is forked at $g$, and a set of short links $G^2$. The links G, G' are pivoted at their opposite ends $g'$ to the felly C and the short links $G^2$ are pivoted at $g^2$ to the ends of the long links and are mounted on the single central pivot $g^3$ on the inner side of the rim D. Three short links $G^2$ are employed, one for each arm of the fork $g$ and one for the straight link G', so that the links are free to cross as shown in Fig. 2. For driving in one direction the force is exerted from the felly through the connected links G, $G^2$, the other links being idle, while for driving in the opposite direction the connected links G', $G^2$ are used and the other pair is idle. Owing to the jointed link connection between the felly and rim freedom is given to the rim within certain limits so that it can move to and fro in the felly (between the side flanges or cheeks of which the rim flanges lie) without affecting the drive. The systems of links adjust themselves to any alteration in position, the longer links being under compression and the shorter links in tension in transmitting the drive.

What we claim and desire to secure by Letters Patent of the United States is:—

1. In a resilient wheel, a hub, tubular spokes on the hub, a felly mounted on the said spokes, a displaceable outer rim, sliding pistons working in the tubular spokes and supporting the said rim without driving connection therewith, and a series of link connections each comprising a pair of long crossing links pivoted at opposite ends to the felly and of short links connecting each long link to the rim.

2. In a resilient wheel, a hub, tubular spokes on the hub, a flanged felly mounted on the said spokes, a flanged displaceable outer rim with flanges lying between the flanges of the felly, sliding pneumatic pump pistons working in the tubular spokes and supporting the said rim without driving connection therewith and a series of link connections inclosed between the felly and rim flanges each connection comprising a pair of long crossing links pivoted at opposite ends to the felly, and of short links connecting each long link to the rim.

3. In a resilient wheel, a hub, tubular spokes on the hub, a felly mounted on the said spokes, a displaceable outer rim, sliding hollow pneumatic pistons in the tubular spokes, pistons fixed on the hub and inclosed in the tubular pistons, air inlet valves at the hub end of the spokes, valves in the said hollow and fixed pistons permitting air to pass radially between the chambers formed by the said spokes and pistons, rollers on the outer ends of the said sliding pistons, supporting the outer rim but allowing of relative lateral movement of pistons and rim, and a series of link connections each comprising a pair of long crossing links pivoted at opposite ends to the felly, and of short links connecting each long link to the rim.

4. In a resilient wheel, a hub, tubular spokes on the hub, a flanged felly mounted on the said spokes, a flanged displaceable outer rim with longitudinal grooves in the flanges, sliding pneumatic pistons in the tubular spokes, rollers carried by the outer ends of the pistons and engaging freely in the said grooves of the rim flanges and a series of link connections between the felly and rim, each connection comprising a pair of long crossing links pivoted at opposite ends to the felly, and of short links connecting each long link to the rim.

In testimony whereof I affix my signature in presence of two witnesses.

ALFRED SPEIGHT.

Witnesses:
A. M. GLASS,
E. C. WALKER.

Copies of this patent may be obtained for five cents each, by addressing the "Commissioner of Patents, Washington, D. C."